March 18, 1952     B. L. CHAMBERS     2,589,340
SKIP STITCH MACHINE
Filed April 29, 1948     10 Sheets-Sheet 1

*INVENTOR.*
BYNOM L. CHAMBERS
BY
*ATTORNEY*

March 18, 1952 B. L. CHAMBERS 2,589,340
SKIP STITCH MACHINE
Filed April 29, 1948 10 Sheets-Sheet 7

INVENTOR.
BYNOM L. CHAMBERS
ATTORNEY

Patented Mar. 18, 1952

2,589,340

UNITED STATES PATENT OFFICE 2,589,340

SKIP STITCH MACHINE

Bynom L. Chambers, Dalton, Ga., assignor, by mesne assignments, to Dixie-Belle Spread Co., Inc., Calhoun, Ga.

Application April 29, 1948, Serial No. 23,983

4 Claims. (Cl. 112—79)

This invention relates to tufting machines of the type generally described as skip stitch or candlewick machines, and commonly used in the making of bedspreads and other articles, where a tufted effect is desired.

Heretofore, various instrumentalities of this general type have been proposed, such breaking down roughly into machines in which the needle is momentarily stopped in producing the desired skip; those in which the thread is interrupted for this purpose; and devices in which a cam is used to cause a feed dog to take a longer than normal stitch at a given time. Such machines, and particularly the last mentioned type, have proved to be generally satisfactory, but have as an inherent weakness a tendency to set up a rough operation. For example, when a needle is stopped, there is a jolt imparted to the entire mechanism, which, in turn, means that very rapid operation is impossible, and in times of high and increasingly higher labor costs, it is imperative that these machines be operated at maximum speeds.

The cam arrangement has proven more satisfactory, but even here, there is a tendency to set up undesirable vibration and wear under rapid operation.

An object of this invention is to provide what amounts to an attachment for a conventional chenille machine, which will produce tufts formed with any desired number of stitches, and space them suitable distances apart, with a minimum of jar or jolt to the machine.

Another object is to provide ready adjustability in a device of the instant type.

Another object is to make possible maximum simplicity of operation in a tufting machine.

Still another object is to provide separate but coordinated mechanisms for feeding the cloth in such a machine in such a manner as to form spaced tufts.

Another object is to provide means in a tufting machine for removing the end of the thread from the cloth.

Another object is to provide a quiet tufting machine.

Another object is to provide a machine that is rugged, and economical in its maintenance.

Another object is to provide a high speed tufting machine.

Another object is to teach a new method of manufacturing tufted material.

These and other objects made apparent during the future progress of this specification are achieved by the instant device, a full and complete understanding of which is facilitated by reference to the drawings herein in which:

Fig. 1 is a side elevational view of the instant tufting machine;

Fig. 3 is a bottom plan view of said chassis;

Fig. 32 is a diagrammatic view illustrating the first cycle of operation during the forming of a tuft;

Like numerals indicate corresponding parts throughout the various figures of the drawings.

Referring now to the drawings, 10 represents the arm of a conventional sewing machine, an old model Singer having been shown for illustrative purposes herein. A head 11 is associated with 10, and a stock 12, which is mounted upon a base 13, supports the upper structure.

The machine is powered in the usual manner as by connecting grooved pulley 14 with a suitable source of energy, the rotation of which pulley and its associated shaft 15 cause a drive chain 16 to rotate a sprocket gear 17, which is fixedly mounted on a shaft 18; and thereby turn a pinion gear 19 likewise mounted on said shaft, said gear meshing with a second similar element 20 on a shaft 21.

A conventional drive shaft in the top portion of the machine is employed to cause a needle 22 to reciprocate in the usual manner.

Yarn or thread is provided from a cone 23 which is positioned upon a stand 24, said thread 25 being first passed upwardly through a guide 26 having an eye 27 and then downwardly and laterally through a guide 28 and a tension device, which will be described in detail hereafter; into head 11, where it engages a reciprocating finger 29, and is then passed downwardly through an adjustable tension member which travels with the needle bar, comprising a stud 30 upon which is fixedly mounted a cup-like guide member 31 co-operating with a similar member 32 which is free to move laterally upon element 30. A coil spring 33 and an adjusting nut 34 complete this arrangement.

A conventional presser foot 35 is adjustably mounted in head 11 in such a manner as to be susceptible of being moved downwardly and engage cloth being processed, or upwardly and out of the way when the material is to be removed, said foot being held against the feed dogs of the machine by spring tension, and traveling with them during the sewing operation.

Figure 2:
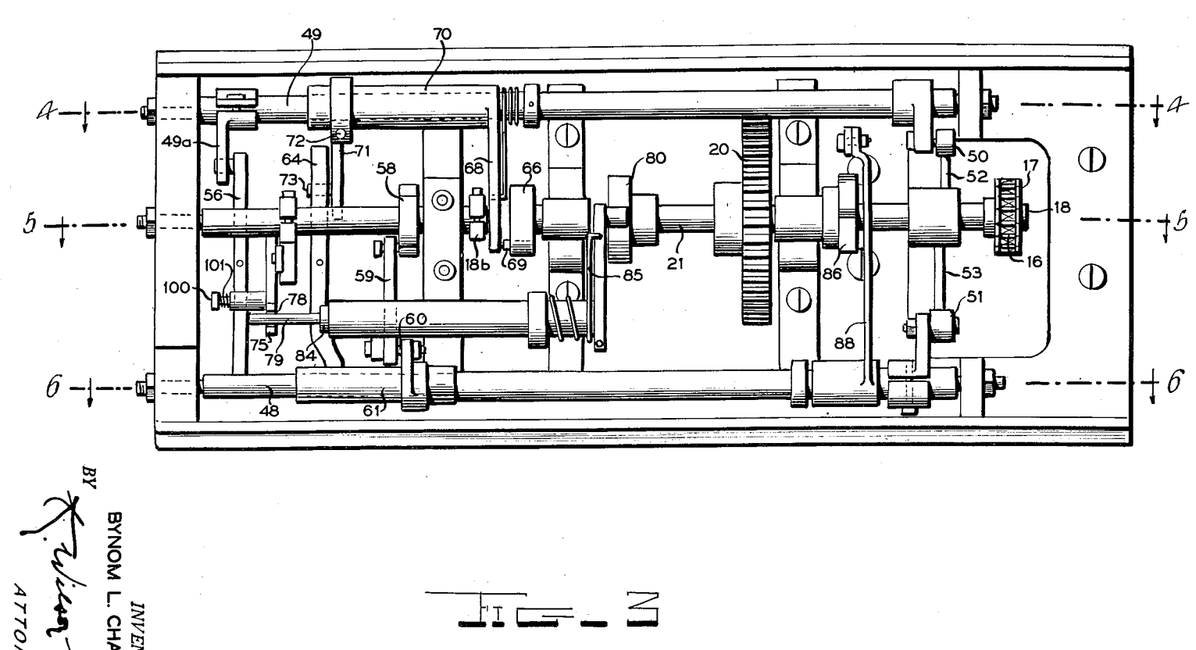
Fig. 2 is an enlarged side elevation of the chassis shown in Fig. 1.
Figure 4:
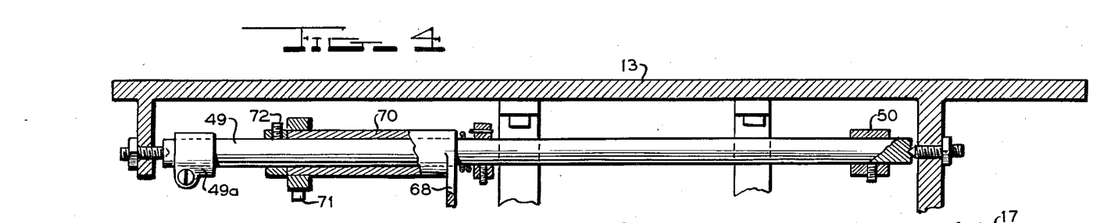
Fig. 4 is a vertical sectional view taken along the line 4—4 of Fig. 3, looking in the direction of the arrows.
Figures 5, 6:
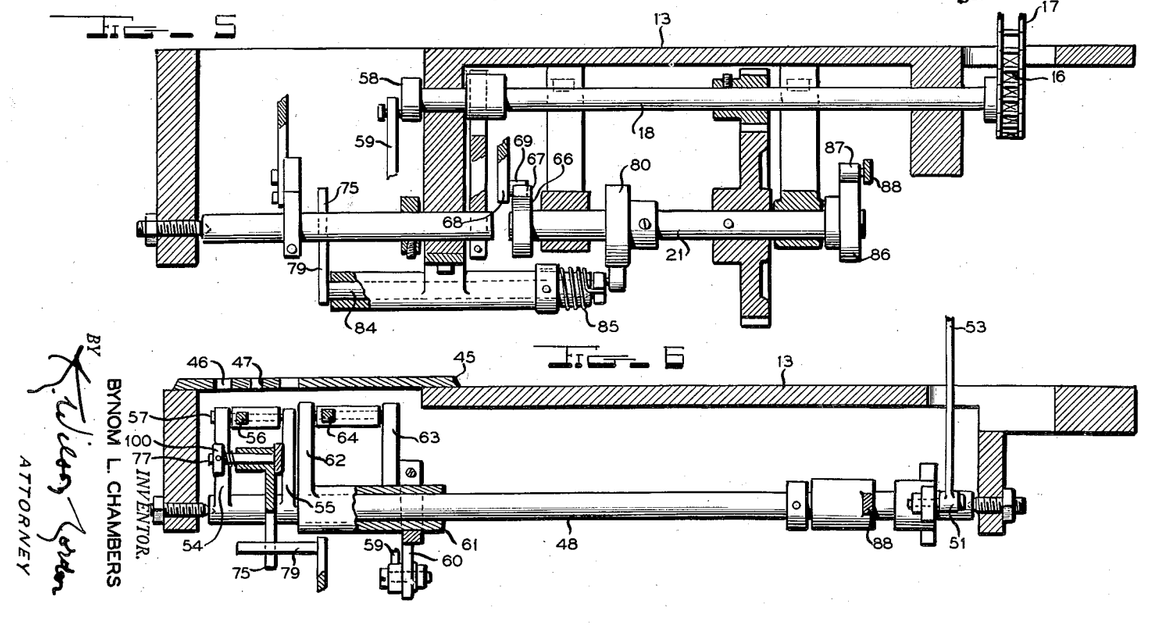
Fig. 5 is a similar view taken along the line 5—5 of said figure.
Fig. 6 is likewise a sectional view taken along the line 6—6 of Fig. 3.
Figures 7, 14, 15, 17, 18:
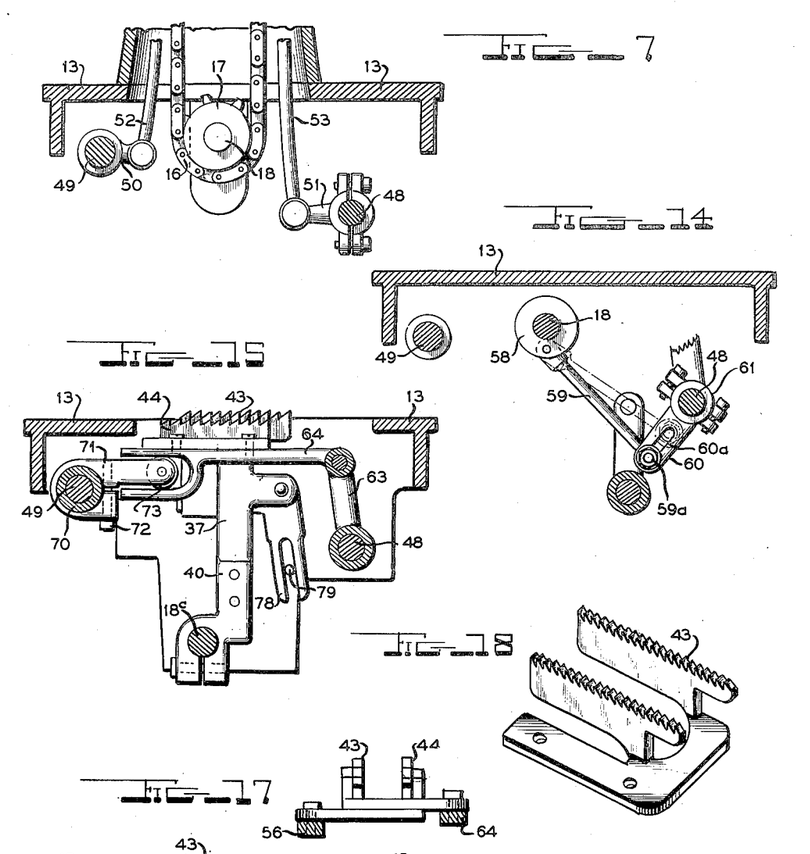
Fig. 7 is a vertical sectional view taken along the line 7—7 of Fig. 2, looking in the direction of the arrows.
Fig. 14 is a sectional view taken along the line 14—14 of said figure.
Fig. 15 is a vertical sectional view taken along the line 15—15 of said figure.
Fig. 17 is an end view partially in section, of the superimposed feed dogs of the instant machine.
Fig. 18 is a view in perspective of one of said feed dogs.
Figures 8, 9, 10, 11, 12, 13:
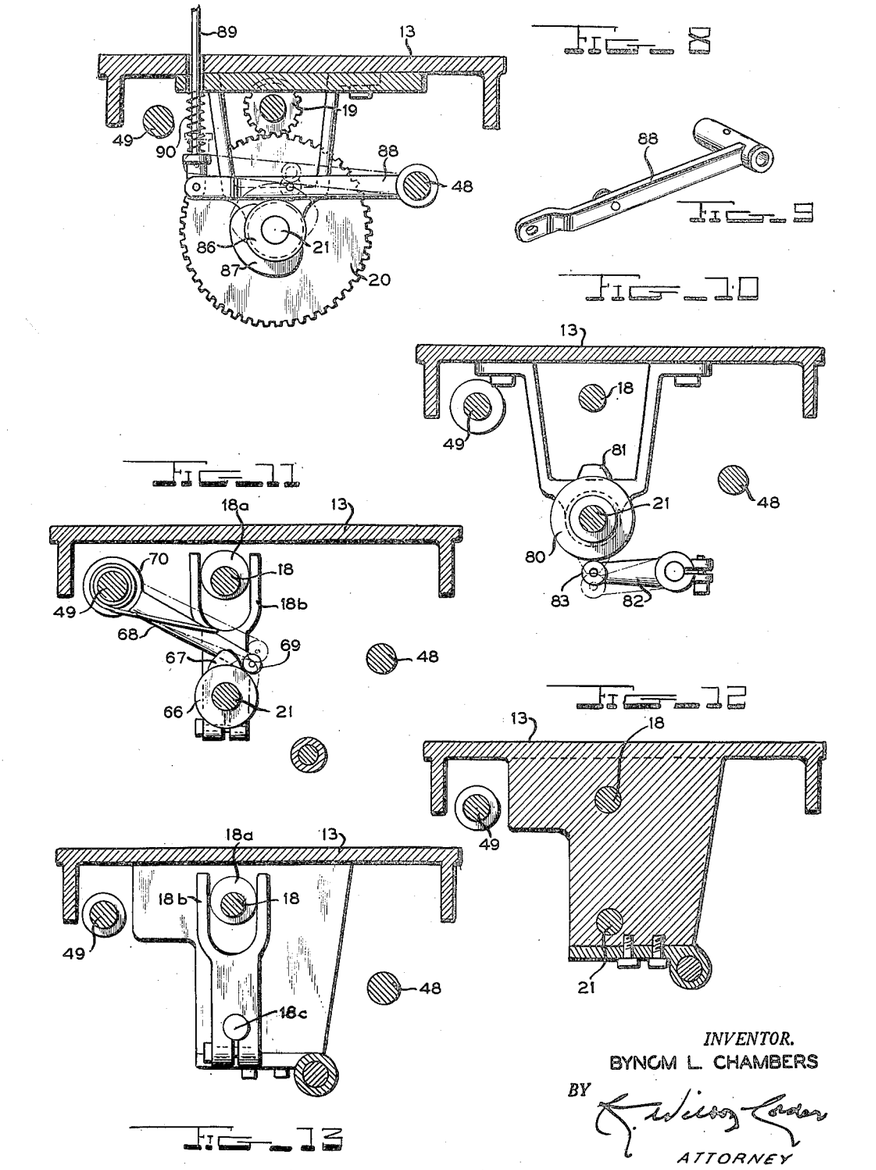
Fig. 8 is a similar sectional view taken along the line 8—8 of said figure, looking in the direction of the arrows.
Fig. 9 is a view in perspective illustrating an arm employed to put tension on a second arm in the sewing head for the purpose of stopping the thread at periodic intervals.
Fig. 10 is a vertical sectional view taken along the line 10—10 of Fig. 2.
Fig. 11 is a similar view taken along the line 11—11 of Fig. 2.
Fig. 12 is a sectional view taken along the line 12—12 of said Fig. 2.
Fig. 13 is a similar sectional view taken along the line 13—13 of said Fig. 2.
Figures 20, 22, 23:
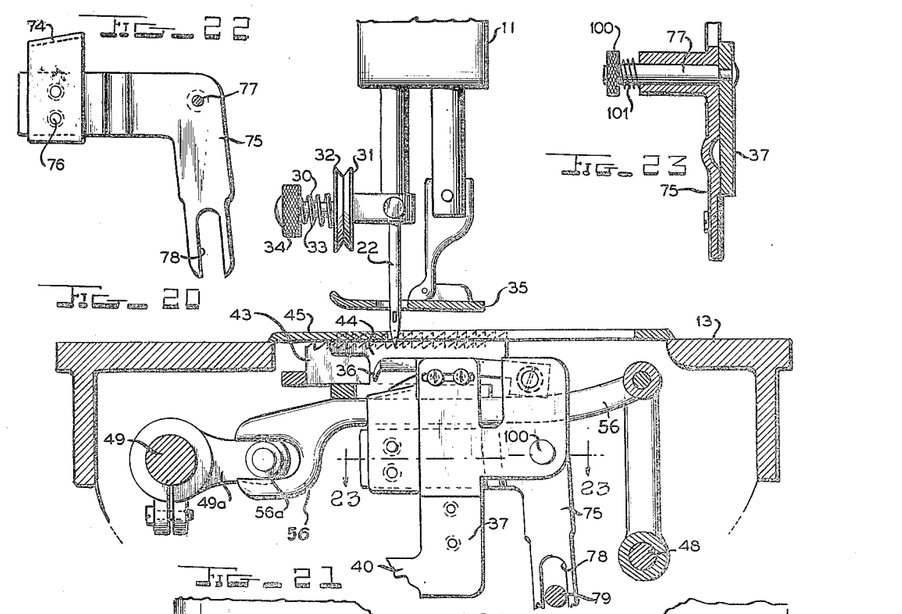
Fig. 20 is a view partially in vertical cross section, illustrating the relationship of the needle bar, feed dogs, the arms for actuating such, and other related structure.
Fig. 22 is a side elevational view of the angular member carrying the cutting knife.
Fig. 23 is a horizontal sectional view taken along the line 23—23 of Fig. 20.
Figure 41:
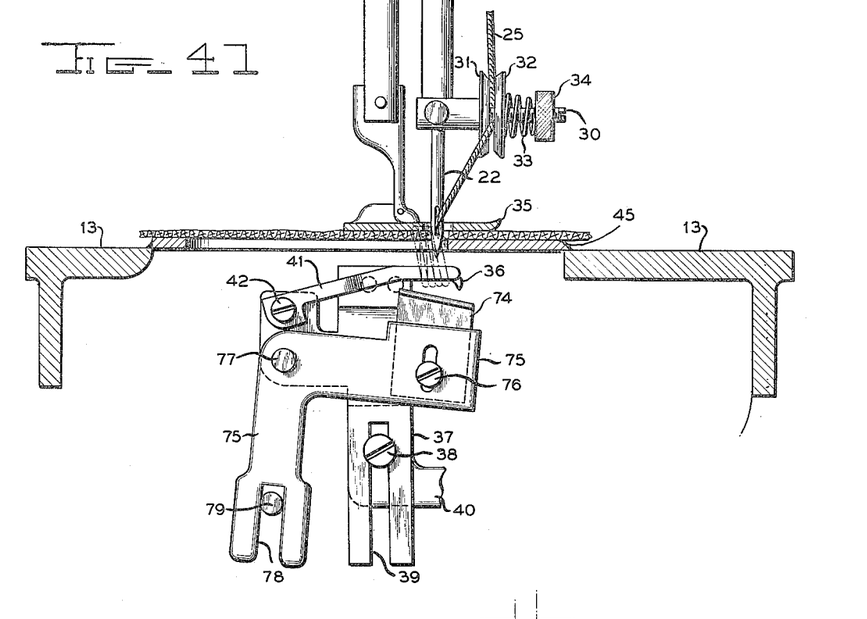
Fig. 41 is a view partially in vertical section, and similar to that of Fig. 20, except that it is taken from the opposite side of the structure.
Figure 42:
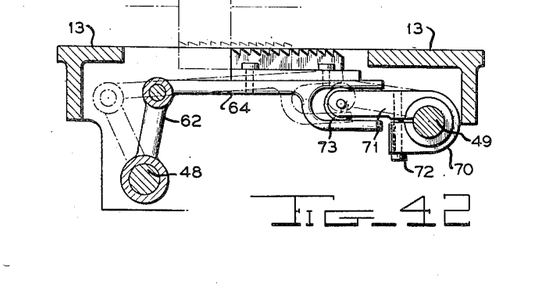
Fig. 42 is likewise a view partially in vertical section, taken transversely of the machine and between the feed dogs, and indicating the potential adjustability in the length of the skip stitch.
Figure 43:
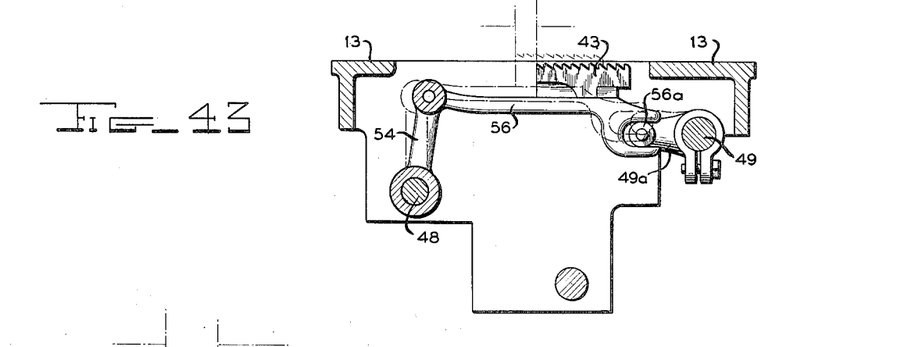
Fig. 43 is a view similar to 42, except that it suggests the total potential adjustability for regular or stitch feed.

A standard looper element comprising a hook-like member 36 (Figs. 20 and 41) is reciprocably mounted in the lower portion of the machine beneath head 11, a carrying bar 37, which is adjustable by virtue of co-operation of a screw 38 with a longitudinal slot 39 in the bar, fastening the looper to a supporting arm 40, which, in turn, is linked to main shaft 18 in such a manner that the looper reciprocates in a generally lateral direction with each downward movement of needle 22, by virtue of co-operation of cam 18a with fork 18b which is mounted on a shaft 18c disposed beneath shaft 18 (Figs. 13 and 15).

A stationery binder element 41 is mounted on one side of looper 36 through the media of a screw 42, said element having a spring-like action in assisting the looper in performing its allotted functions.

Figure 19:
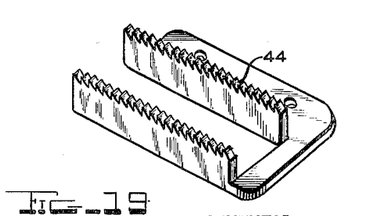
Fig. 19 is a similar view of the other of said feed dogs.

Special attention is now directed to the feed dogs of the instant machine. These comprise a pair of notched elements 43 and 44 (Figs. 18 and 19), which are operably mounted under head 11 in conjunction with a face plate 45 (Fig. 24), having longitudinal slots 46 and 47. One of said feed dogs is contemplated to take a normal or short stitch, whereas the other is constructed to rise above the first after one or more stitches have been taken (a three and one arrangement is illustrated herein), and make what amounts to a long or skip stitch, concurrent with which the loops formed in the cycle up to that point are automatically severed, and a new tuft forming operation commenced. Both feed dogs are reciprocating at all times during the operation of the machine.

Figure 16:
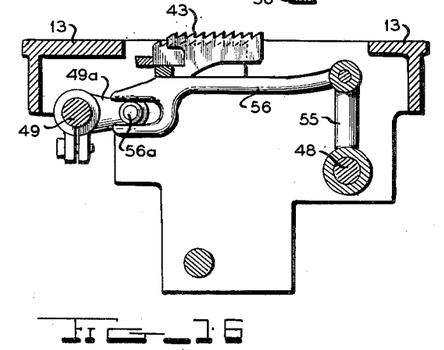
Fig. 16 is a sectional view taken along the line 16—16 of Fig. 2.
Figures 25, 26, 27, 28, 29, 30, 31, 32:
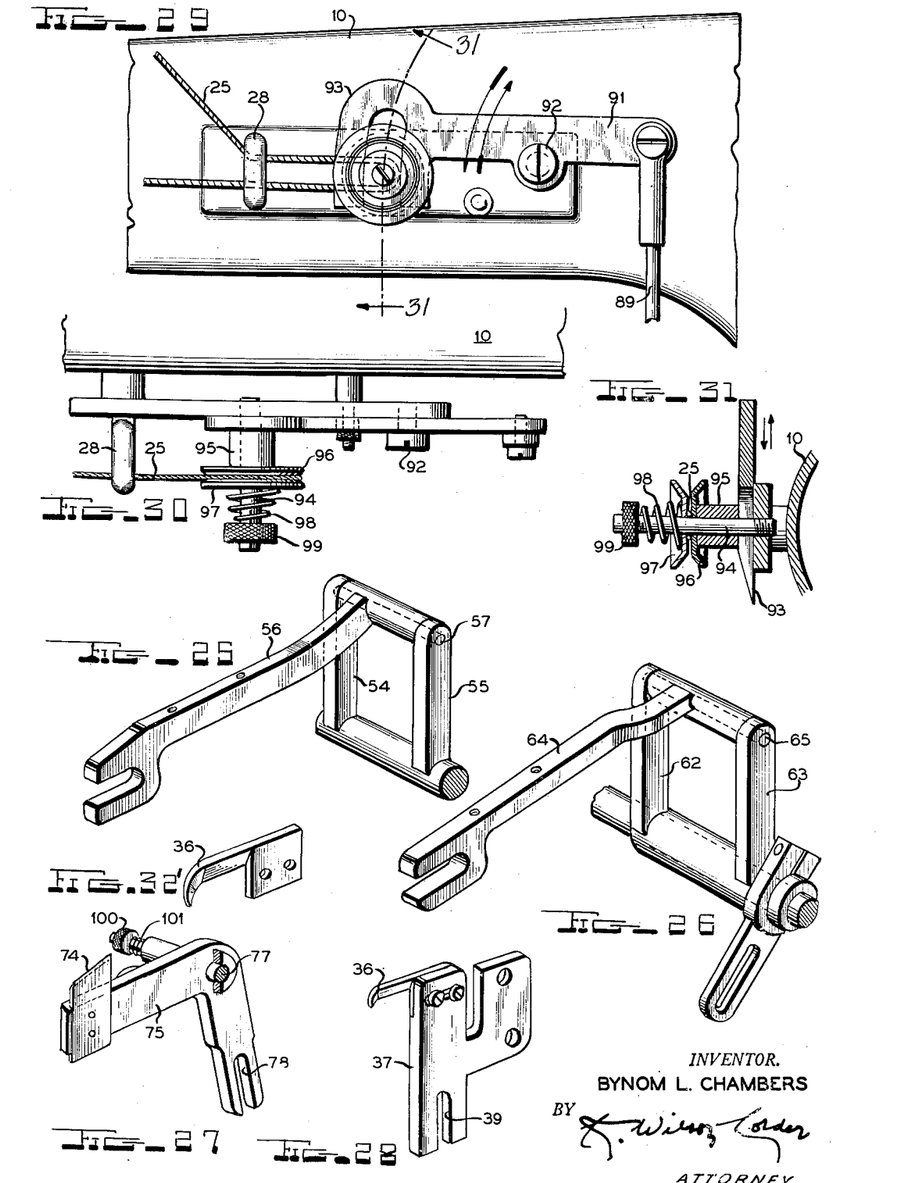
Fig. 25 is a view in perspective of one of the arms employed to actuate a feed dog.
Fig. 26 is a similar view of the other co-acting arm employed for this purpose.
Fig. 27 is a view in perspective of the movable knife employed to cut the loops at appropriate intervals.
Fig. 28 is a view in perspective of the looper which cooperates with said knife.
Fig. 29 is an enlarged front elevational view, fragmentary in part, showing the yarn stopping feature of the instant tufting machine.
Fig. 30 is a top view of the structure shown in Fig. 29.
Fig. 31 is a view in approximate vertical section taken along the line 31—31 of Fig. 29.
Fig. 32' is a view in perspective of the looper element per se.
Figure 32:
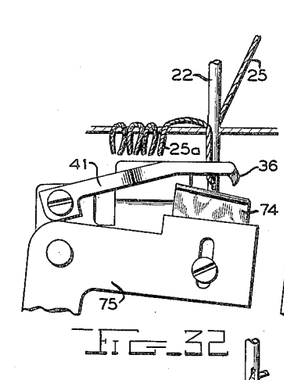

Short stitch feed dogs 43 are actuated horizontally by means of shaft 48 which extends lengthwise through the machine, and take their vertical movement from a similar shaft 49 on the opposite side of the device, said shafts being caused to rock by virtue of bell cranks 50 and 51 co-operating with arms 52 and 53 which extend upwardly into the stock of the machine, there to be actuated off shaft 15 in a conventional manner. Shaft 48 is provided with a pair of upstanding arms 54 and 55 (Fig. 25) which are connected to a feed dog carrier 56, by means of a pin 57, which permits this joint to move or swing. Feed dog carrier 56 has a slot in one end, working on a roller 56a carried by a lever 49a clamped to shaft 49, (see Fig. 16).

The auxiliary feed dogs 44 have a separate operating mechanism, comprising a crank or disc 58 (Fig. 14), which is placed on the end of main shaft 18, and which carries a connecting rod 59, which engages a lever 60, which, in turn, is clamped to a sleeve 61 rotatably mounted on rod 48. Said sleeve has two levers 62 and 63 (Fig. 26), which project upwardly and are connected to a feed dog carrier 64 by a pin 65, which permits this joint to move or swing.

It will be noted that the length of the long stitch is easily regulated by adjusting arm 59 with lever 60 (Fig. 14), it only being necessary to loosen nut 59a and slide 59 in slot 60a to lengthen or shorten this stitch, upon which 59a is tightened to maintain the desired relationship.

Main shaft 18 always turns at the same speed as the top shaft of the machine, which drives the needle bar, and hence it is apparent that feed dog 44 will reciprocate with each stroke of the needle, and as each stroke is made.

Special attention is now directed to the manner in which the second feed dogs are caused to periodically rise in their travel, above the first feed dogs. To accomplish this, a cam 66 is placed upon the lower-most shaft 21 of the machine, said cam having a single high point 67 (Fig. 11), and being rotated at a speed one-fourth that of shaft 18, by virtue of the relationship between gears 19 and 20, referred to previously. A lever 68 carrying roller 69 connects with a sleeve 70, which is rotatably mounted on shaft 49; in such a manner that only the high point of the cam encounters the roller. The lever is moved upwardly by the cam, as indicated by the dotted lines in Fig. 11, which, in turn, actuates a second lever 71, which is clamped to sleeve 70 as at 72, to allow for adjustment, said lever 71 having a roller 73 at one end thereof and co-operating with second feed dog carrier 64 (Fig. 15), which is, in turn, connected to feed dogs 44.

Means for cutting or severing the loops at appropriate intervals is provided by conventional knife member 74, which is adjustably mounted in a holding arm 75 by means of screw 76, said arm being pivoted at 77, and having a longitudinal slot 78, in its lower portion in which travels a rod 79. The cutting mechanism is actuated through the medium of a cam 80 (Fig. 10), having a high point or lobe 81, and co-operating with a lever 82 in conjunction with a roller 83, a shaft 84 being actuated against the pressure of spring 85, so as to cause bar or lever 79 to periodically rise in slot 78, thereby causing knife holder 75 to pivot in a counter-clockwise direction, and sever loops previously formed upon looper 36.

Attention is now directed to the mechanism for applying tension to the yarn immediately after each long or skip stitch, said mechanism comprising a cam 86 (Fig. 8), having a lobe 87, and being mounted on shaft 21 co-operates with an arm 88 pivoted on shaft 48, and at its opposite end to a connecting rod 89 acting against the tension of a spring 90, which at its top engages a bell crank 91 pivotly mounted to element 10 through a screw 92, and having a wedge-shaped or tapering end 93. A tension stud 94 is mounted adjacent 93 in such a manner that when pushed behind a collar 95 thereon, tension discs 96 and 97 are forced together against the spring pressure of element 98, thereby hindering the passage of thread 25 through the tension. An adjusting nut 99 screwed on the end of 94 provides for variation of the tension factor.

The degree of tension with which knife-carrying arm 75 is secured to holding element 37 may be varied through adjusting nut 100 (Fig. 23) on carrying stud 77 against coil spring 101.

Figures 21, 24:
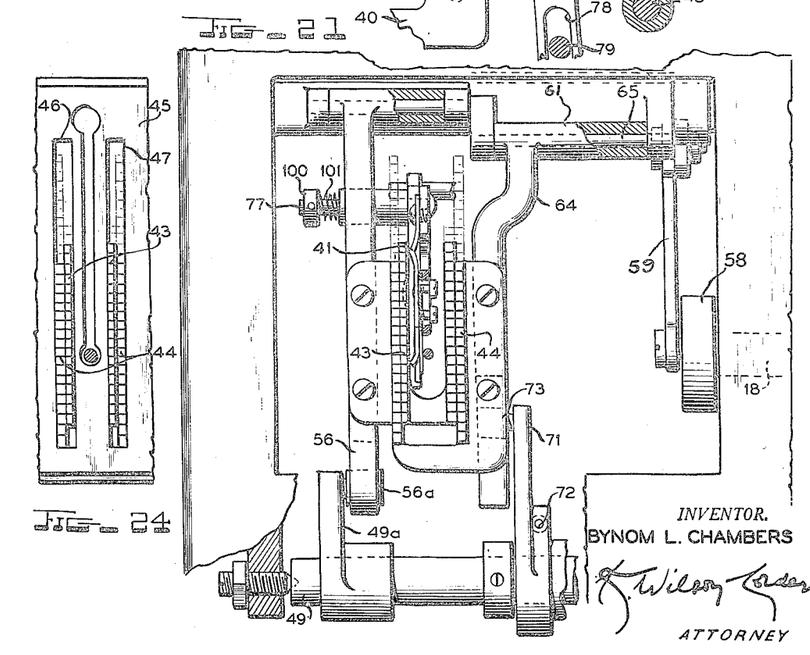
Fig. 21 is a plan view of the structure shown in Fig. 20, partially encased.
Fig. 24 is a view in elevation of a portion of the cover plate, said view being fragmentary in part.

The operation of the instant Skip Stitch Machine is as follows:

Assuming that the device has been threaded as indicated, a piece of cloth placed in position and presser foot 35 lowered as shown in Fig. 21, power is applied to pulley 14, as for example, from an overhead source through a belt, thus causing shaft 15 to rotate and needle bar 22 to reciprocate in the usual manner. Concurrent with this, chain 16 is driving sprocket 17 on main shaft 18 thereby rotating gears 19 and 20, and hence shaft 21 at a four to one ratio. Concurrently with this, the short stitch feed dogs are being reciprocated by virtue of movement of shafts 48 and 49, in conjunction with feed dog holder 56 and arm 49a as previously described.

Figure 33:
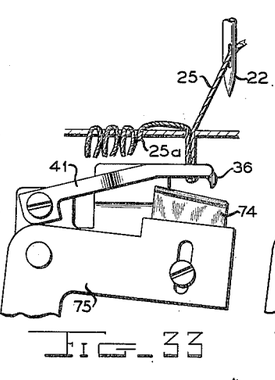
Fig. 33 is a similar view illustrating the second cycle.
Figure 34:
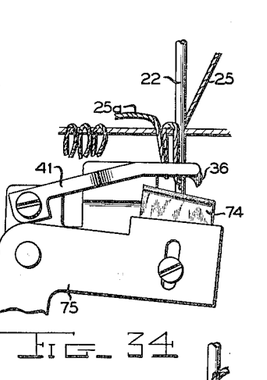
Fig. 34 is a similar view illustrating the third cycle of such operation.
Figure 35:
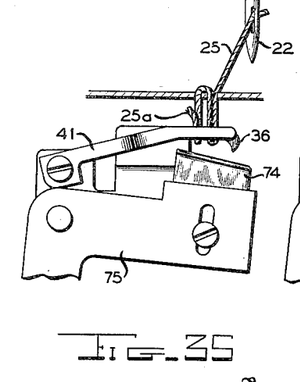
Fig. 35 is a similar view illustrating the fourth cycle.
Figure 36:
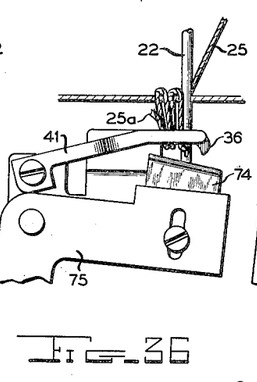
Fig. 36 is a similar view illustrating the fifth cycle.
Figure 37:
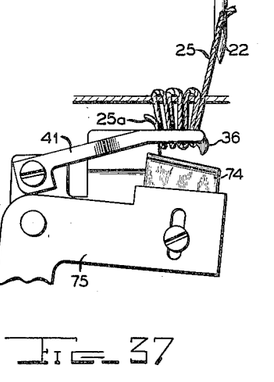
Fig. 37 is a similar view illustrating the sixth cycle, under an arrangement where three short stitches are taken, followed by a long one or "skip"

As needle 22 descends and pierces the cloth, looper 36 moves forward (Fig. 32) thereby aiding in forming the first stitch, binder 41 also assisting the looper in this function by exerting pressure on the thread against the side of the looper. The needle then withdraws (Fig. 33) and the short stitch feed dogs simultaneously operate to move the cloth forward one stitch length, upon which the needle again pierces the cloth (Fig. 34) and forms the second loop upon 36 (Fig. 35) which co-operates with each movement of said needle, which operation is repeated until the desired number of stitches has been formed, an arrangement whereby three short stitches are present having been illustrated in this instance, although it is apparent that any reasonable number of stitches from one on up may be handled in this manner.

Figures 38, 39:
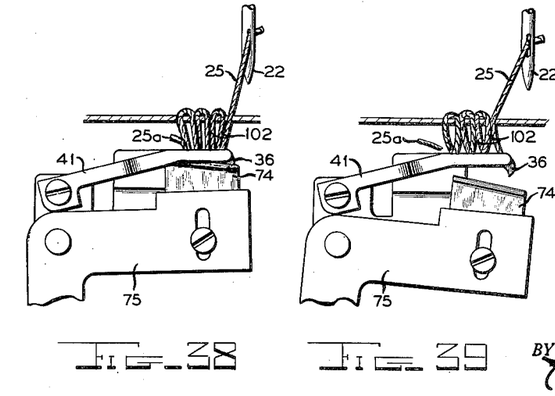
Fig. 38 illustrates loops formed in the preceding figures in the process of being cut.
Fig. 39 illustrates the loops having been cut, and the knife withdrawn.
Figure 40:
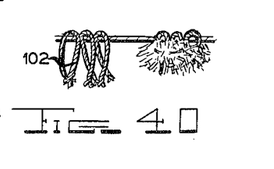
Fig. 40 shows a piece of fabric in which tufts have been formed in the foregoing manner, the tuft to the right being a finished one, as such would appear after initial laundering.

At this point, several things occur in closely synchronized relationship, including the high point 81 on cam 80 contacting roller 83, in such a manner as to move lever 82 downwardly as suggested by the dotted lines in Fig. 10, thereby rotating shaft 84 and connecting lever 85 in such a manner as to cause shaft 79 to move knife 74 upwardly as described heretofore, said knife engaging and cutting loops 102, as suggested in Figs. 38 and 39. In the actual cutting operation, knife 74 is between looper 36 and binder 41, the latter assisting in some degree in holding the ends of the threads in place during this phase. Said knife and its supporting arm, then return to their inoperative position.

The skip stitch is made by the high point 67 of cam 66 contacting roller 69 and elevating arm 68 (Fig. 11), thereby rotating sleeve 70 and feed dog carrier 64 in such a manner as to cause feed dogs 44 to rise above feed dogs 43 and take a long stitch, the length of which is adjustable as previously described, upon which the feed dogs 44 return to their normal position and needle bar 22 again pierces the cloth.

At this instant, segment 87 of cam 86 has risen to contact arm 88, and force such upwardly which, in turn, moves rod 89 causing the end 93 of element 91 to move downwardly and by virtue of a wedge action, forcing collar 95 outwardly and the tension discs together, which momentarily hinders the passing of yarn through the tension. This action, in turn, causes the end 25a of the yarn to be drawn back through the cloth (see Fig. 35), where it is cut off as waste on the next action of knife 74.

From the foregoing, it is apparent that the instant machine accomplishes an efficient and high speed tufting operation with a minimum of vibration, and attendant undesirable maintenance and other problems, by virtue of the smooth and continuous operation of both feed dogs at all times when the machine is in use, there being no sudden jar or bump as occurs in the old needle stopping and thread stopping devices, or in the arrangement where a high point on a single cam causes a single feed dog to take a long stitch, this interruption in the normal cycle of the feed dog being vibration-producing to some degree. Here, there are two closely synchronized feed dogs each having a normal pattern or cycle of operation, which is at no time upset or disturbed by the action of the other, the result being a smoothness of operation that has not been heretofore obtainable in devices of the instant type.

It will also be noted that ready adjustability is here present, by virtue of conventional stitch adjuster 103 in the case of short stitches, and through the arrangement illustrated in Fig. 14 for the long stitch, this factor being important when considering the fact that prior art devices either are not adjustable or entail considerable trouble in reaching this result.

Finally, it will be apparent that the manner in which tension is automatically applied whereby no more yarn may be pulled from the cone or spool as the initial short stitches are being made, and pulling the end first up out of the cloth, and then back down to be cut off as waste and eliminated, is both ingenious and desirable.

The instant machine is rugged and simple in its structure, economical to maintain, and thoroughly suited for its indicated purposes. While there has been shown and described herein in considerable detail one form of this invention, and the method of practicing such, it will be apparent that certain alterations, additions, reconstructions, and other changes may be resorted to without departing from the inventive concepts of the appended claims, which are to be fairly construed in keeping with the contribution to the art.

I claim:

1. A tufting machine attachment for a sewing machine comprising a looper, a cutting element pivotally secured thereto, means for actuating the looper and separate means to periodically close said cutting element against said looper whereby to sever loops of yarn formed thereon, and means to feed work through the machine concurrently with the forming and severing of the loops, said means, comprising a pair of synchronized feed dogs, means to drive said dogs, and means to cause one of said dogs to periodically rise above the other and take a long or skip stitch.

2. A tufting machine attachment for a sewing machine comprising a looper, a binder adjacent thereto and cooperating therewith, a cutting element pivotally secured to the looper, means for actuating the looper and separate means to periodically close said cutting element against said looper whereby to sever loops of yarn formed thereon, and means to feed work through the machine concurrently with the forming and severing of the loops, said means, comprising a pair of synchronized feed dogs, means to drive said dogs, and means to cause one of said dogs to periodically rise above the other and take a long or skip stitch.

3. A tufting machine attachment for a sewing machine comprising a looper, a binder adjacent thereto and cooperating therewith, a cutting element pivotally secured to the looper, means for actuating the looper and separate means to periodically close said cutting element against said looper whereby to sever loops of yarn formed thereon, and means to feed work through the machine concurrently with the forming and severing of the loops, said means, comprising a pair or synchronized feed dogs, means to drive said dogs, and cam means to cause one of said dogs to periodically rise above the other and take a long or skip stitch.

4. A tufting machine attachment for a sewing machine comprising a looper, a binder adjacent thereto and cooperating therewith, a cutting element pivotally secured to the looper, means for actuating the looper and separate means to periodically close said cutting element against said looper whereby to sever loops of yarn formed thereon, and means to feed work through the machine concurrently with the forming and severing of the loops, said means, comprising a pair of synchronized feed dogs, means to drive said dogs, and cam means to cause one of said dogs to periodically rise above the other and take a long or skip stitch, said feed dogs being driven simultaneously and continuously during the time the sewing machine is in operation.

BYNOM L. CHAMBERS.

REFERENCES CITED

The following references are of record in the file of this patent:

UNITED STATES PATENTS

| Number | Name | Date |
|---|---|---|
| 1,317,006 | DeVoe | Sept. 23, 1919 |
| 2,228,220 | Anton | Jan. 7, 1941 |
| 2,311,802 | Windham | Feb. 23, 1943 |
| 2,346,467 | Bills et al. | Apr. 11, 1944 |
| 2,411,883 | Kile | Dec. 3, 1946 |